April 26, 1955 H. K. BAKER 2,706,912
DOUBLE SCREW FEED
Filed March 21, 1951 5 Sheets-Sheet 4

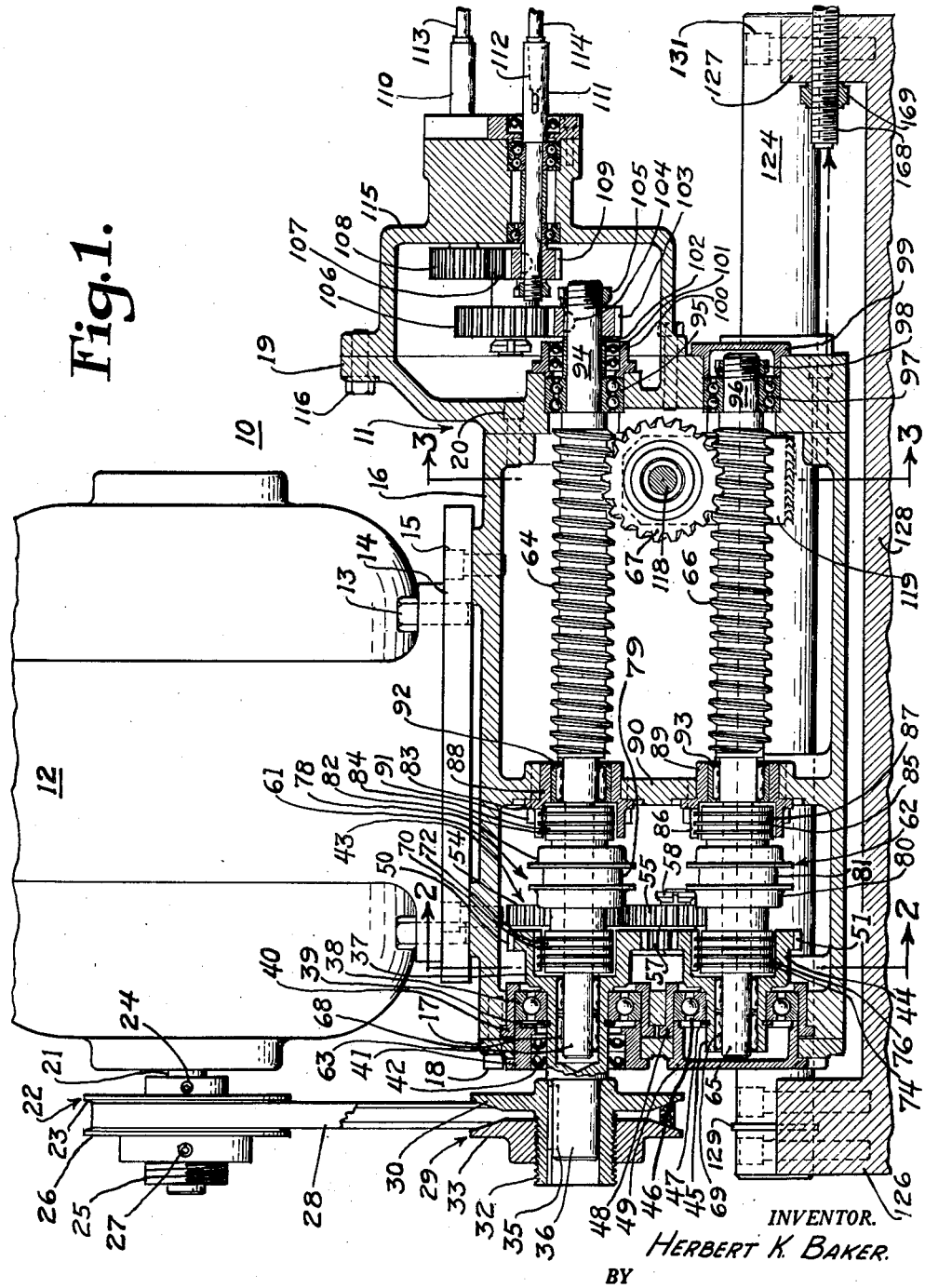

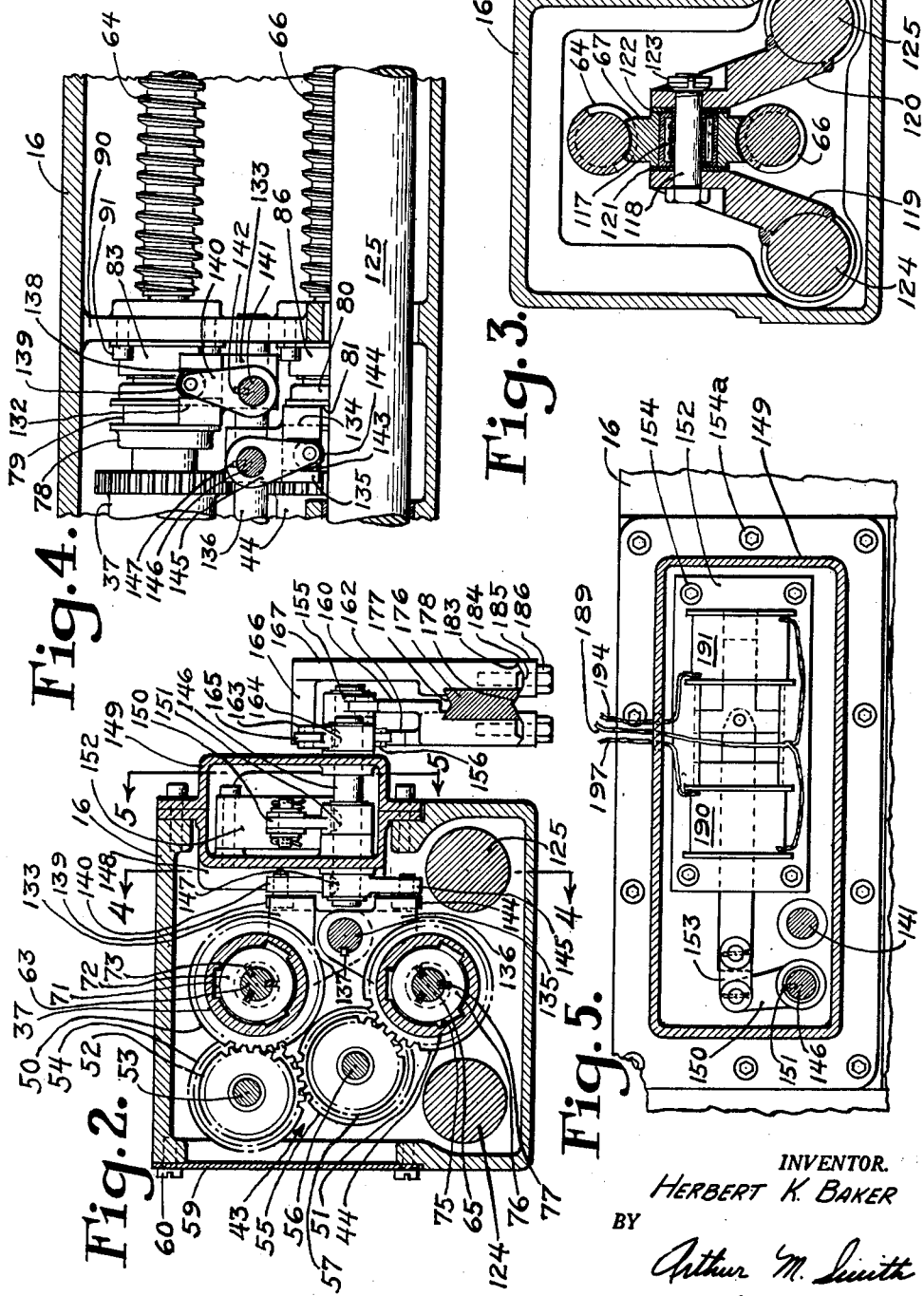

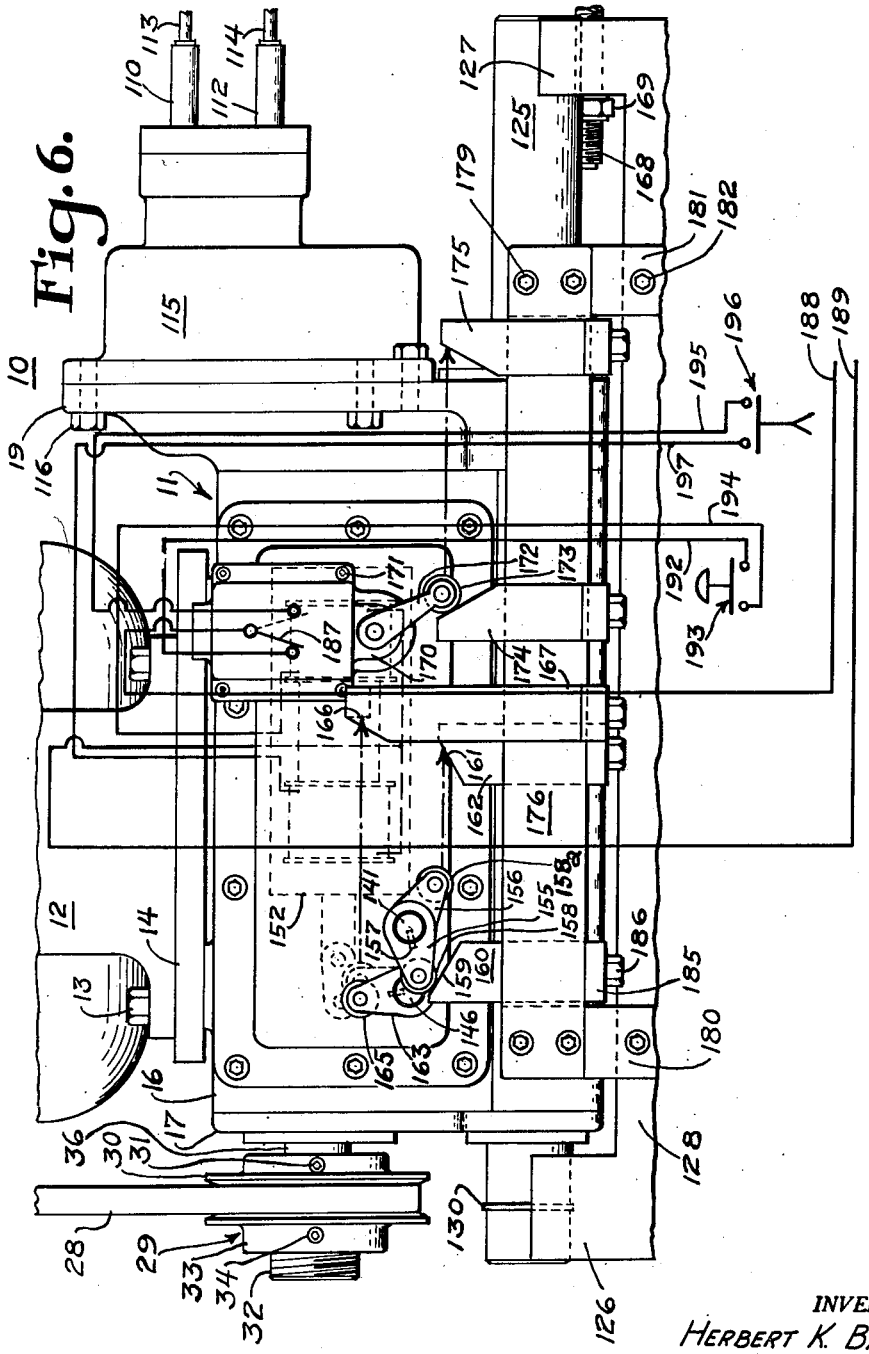
INVENTOR.
HERBERT K. BAKER
BY
Arthur M. Smith
ATTORNEY

*Fig. 7.*

INVENTOR.
HERBERT K. BAKER
BY
Arthur M. Smith
ATTORNEY

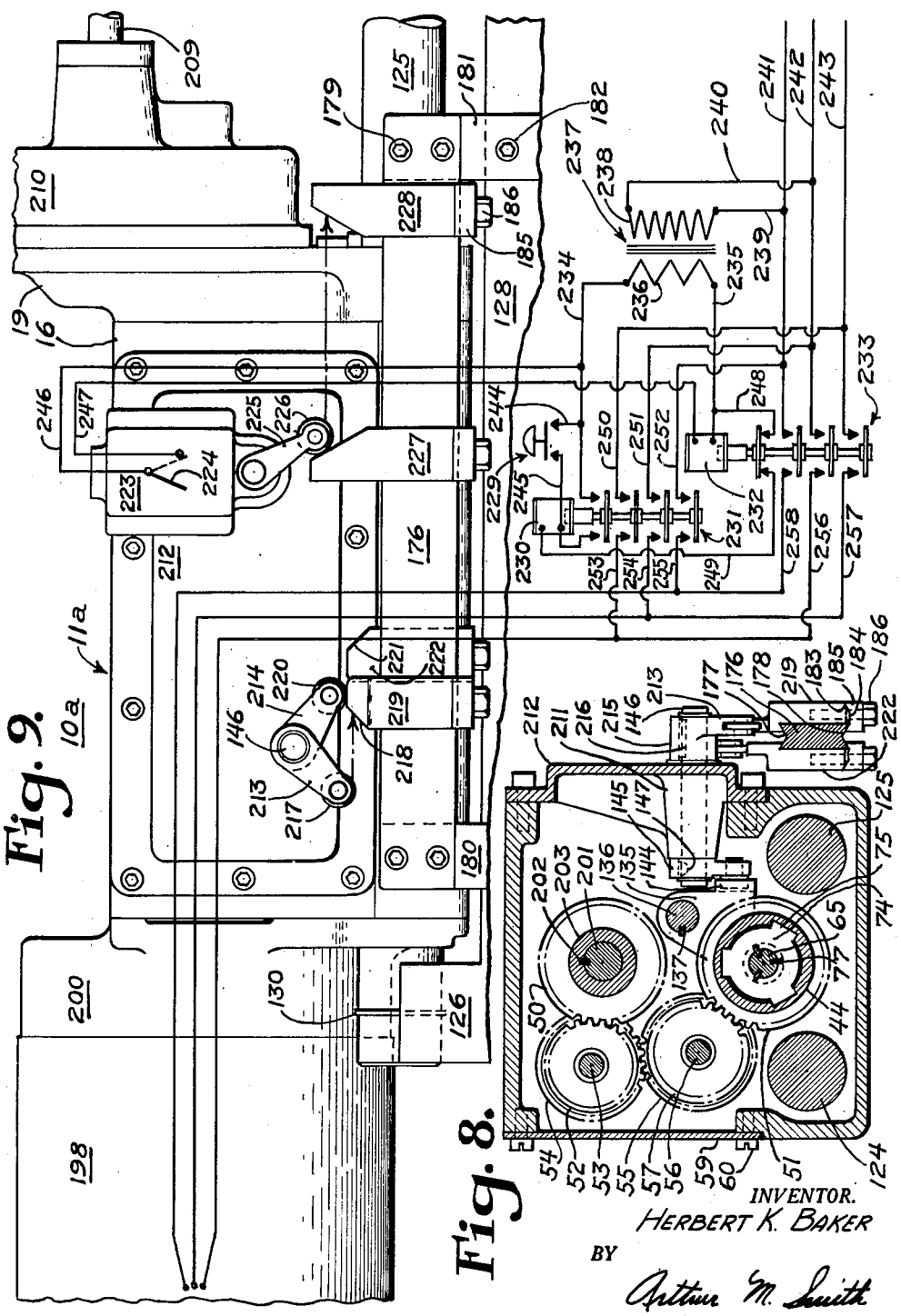

| United States Patent Office | 2,706,912
Patented Apr. 26, 1955 |
|---|---|

2,706,912
DOUBLE SCREW FEED

Herbert K. Baker, Detroit, Mich., assignor of twenty-four per cent to Harriett V. Baker and twenty-four per cent to Herbert K. Baker, Jr., both of Wayne County, Mich.

Application March 21, 1951, Serial No. 216,783

2 Claims. (Cl. 74—58)

This invention relates to apparatus particularly adaptable to the feed of cutting tools and other elements requiring similar travel motion, and in common with the disclosure contained in my United States Patent No. 2,516,842, issued August 1, 1950, includes in the arrangement of mechanism two worms spaced apart and a worm gear operating between and in mesh with both worms for imparting the feed or travel motion.

Among the important objects of the present invention is to provide rotatable mounting of the worm gear on a unique stationary support to operatively cause lengthwise travel motion of the worms and therewith the housing in a manner providing rugged support for a tool-holding spindle or shaft.

Another object of the present invention is to provide further simplification of the mechanism to enhance compactness of assembly by utilizing one of the worms in the dual function to cooperatively impart travel motion and to drivingly rotate a toolholding spindle.

Another object of the present invention is to provide means for obtaining a dwell at the end of one direction of travel motion for a predetermined length of time before reversing direction of travel.

Another object of the present invention is to provide means for obtaining the phases of travel motion such as "rapid approach," "lead-in," "lead-out," and "rapid return" for the operation of tapping or threading.

Another object of the present invention is to provide an arrangement of mechanism to include a pair of pick-off gears readily and accessibly positioned for quick substitution by another pair of a different ratio for altering the relative speed of the worms to change the rate of travel motion.

Still other objects of the present invention are to provide an arrangement of mechanism flexible as to ready adjustment for altering the length of various phases of travel motion, and to impart a constantly controlled uniform feed, such as required for cutting tools, to prevent surging as frequently occurs upon a drill breaking through a metallic section when fed by conventional hydraulic or pneumatic means.

Other objects of this invention will appear in the following description and appended claims, reference being had to the accompanying drawings forming a part of this specification wherein like reference characters designate corresponding parts in the several views.

In the drawings:

Fig. 1 is a central vertical section according to one form of this invention.

Fig. 2 is a vertical cross section taken on line 2—2 of Fig. 1 showing a gearing arrangement controlling the relative speed of the worms.

Fig. 3 is a vertical cross section taken on line 3—3 of Fig. 1 showing the worm gear mounting arrangement.

Fig. 4 is a sectional view taken on line 4—4 of Fig. 2 showing clutch shifting mechanism.

Fig. 5 is a sectional view taken on line 5—5 of Fig. 2 to reveal a solenoid with an actuating lever for clutch shifting.

Fig. 6 is a side view of the housing enclosing the apparatus shown in Fig. 1, showing a trip dog arrangement and actuating levers for clutch shifting, together with a schematic diagram of the electric controls and circuit.

Fig. 7 is a central vertical section according to a second form of this invention.

Fig. 8 is a vertical cross section taken on line 8—8 of Fig. 7 showing a gearing arrangement for controlling the relative speed of the worms.

Fig. 9 is a side view of the housing enclosing the apparatus shown in Fig. 7, showing a trip dog arrangement and actuating levers for clutch shifting, together with a schematic diagram of the electric controls and circuit.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings in detail, Figs. 1 to 6 show the apparatus for imparting travel motion, generally designated 10, according to a first form of the invention, comprising a housing 11 generally supporting and encasing the actuating mechanism, and the reference numeral 12 indicates an electric driving motor which is bolted as at 13 to the mounting plate 14 secured by bolts 15 to the housing portion 16, which has a rearward housing cover 17 bolted thereto as at 18, and a forward housing cover 19 bolted as at 20. The motor shaft 21 has mounted and keyed thereon, a sheave generally designated 22 consisting of a forward sheave half 23 held to position on motor shaft 21 by set screw 24 and having an extended externally threaded sleeve-like portion 25 on which the rearward sheave half 26 is threaded in a manner for adjustment to effect change in sheave pitch diameter, and this sheave half 26 is held to position by set screw 27. The sheave 22 drives a V-belt 28, which in turn, drives a sheave 29 (Figs. 1 and 6) consisting of a forward sheave half 30 held to position by set screw 31, and this sheave half likewise having an extended sleeve-like portion designated 32 on which a rearward sheave half 33 is threaded and held to position by set screw 34 (Fig. 6) in a manner to also provide adjustment to effect the driving pitch diameter of sheave 29 as means for tightening the V-belt.

The sheave 29 (Fig. 1) is keyed as at 35 and drivingly mounted on a shaft portion 36 of a driving clutch cup 37, which is rotatably supported by the inner race of an anti-friction bearing 38 held to position on the shaft portion 36 by snap ring 39 and the outer race of this anti-friction bearing is supported and held to position by the bored recess of sleeve 40 and bearing retainer 41 secured to the rear housing cover 17. The bearing retainer 41 is bored and recessed for insertion therein of oil seals 42 for preventing the leakage of lubricating oil from the housing.

The drive to the driving clutch cup 37 is further transmitted through the gearing arrangement generally designated 43 (Figs. 1 and 2) to the driving clutch cup 44, which has a tubular shaft portion 45 supported by the inner race of anti-friction bearing 46 held to position on the tubular shaft 45 by snap ring 47 and the outer race of this bearing supported and held to position by the bored and recessed sleeve 48, and the bearing retainer cap 49 secured to the rearward housing cover 17.

Formed circumferentially around a stepped periphery of clutch cup 37 is gear 50, and likewise gear 51 is formed on clutch cup 44 (Figs. 1 and 2). Meshed with and driven by gear 50, is gear 52, which is mounted drivingly on shaft 53 with gear 54 meshed with, and driving gear 55 drivingly mounted on shaft 56 with gear 57, which in turn, is drivingly meshed with gear 51 of the clutch cup 44. The gear 55 is held on the shaft 56 by lock nut 58 (Fig. 1) and likewise gear 54 is held on shaft 53 by a similar lock nut which is obstructed from view. In this arrangement just described, the gears 54 and 55 form the pair of pick-off gears for substitution, when desired by another pair of gears of different ratio for altering the rate of travel motion such as required for varying the rate of feed of cutting tools, and this pair of gears is made readily accessible by removal of the side cover 59 (Fig. 2) held to housing portion 16 by screws 60.

A conventional type of multiple disc clutch 61 is arranged to be driven by the clutch cup 37, and a similar clutch designated 62 is arranged to be driven by the clutch cup 44. The clutch 61 is drivingly mounted on the shaft portion 63 extending rearward from worm 64, and the clutch 62 is drivingly mounted on the shaft portion 65 of worm 66 in arrangement including a worm gear 67 operating between worms 64 and 66 and in mesh therewith (Figs. 1 and 3). Shaft portion 63 is rotatably supported by needle bearings 68 mounted in the central bored recess of the shaft portion 36 of the clutch cup 37 (Fig. 1), and the shaft portion 65 is rotatably supported by needle bearings 69 mounted in the central bore of the tubular shaft portion 45 of the clutch cup 44 to provide for rotation of the clutch cups while either one or both worms 64 and 66 are restrained from rotation.

Both clutches 61 and 62 each have at their opposite end portions a group of clutch discs, the rearward group of clutch 61 comprises clutch discs 70 having ears 71 projecting into correspondingly formed internal grooves of clutch cup 37, and alternating with clutch discs 70 are clutch discs 72 keyed to the shaft portion 63 (Figs. 1 and 2) as at 73. The rearward group of clutch 62 consists of clutch discs 74 with ears 75 projecting into correspondingly formed internal grooves of clutch cup 44 and alternating with clutch discs 74 are clutch discs 76 keyed to the shaft portion 65 as at 77.

Between the rearward and forward groups of clutch discs of clutch 61 is shipper sleeve 78 with a centrally located groove 79 (Figs. 1 and 4), and likewise between the two groups of clutch discs 62 is shipper sleeve 80 centrally grooved as at 81. The forward group of clutch discs of clutch 61 comprises clutch discs 82 having ears projecting into correspondingly formed slots in the brake cup 83, and alternating with the clutch discs 82 are clutch discs 84 keyed to the shaft portion 63. The forward group of clutch discs of clutch 62 consists of clutch discs 85 having ears projecting into correspondingly formed slots in brake cup 86, and alternating with clutch discs 85 are clutch discs 87 keyed to the shaft portion 65.

The brake cups 83 and 86 have turned down hubs 88 and 89, respectively, mounted in correspondingly bored holes of partition 90. The brake cups are rigidly secured to the partition by bolts 91. The brake cup 83 is centrally bored for mounting a needle bearing 92 therein. The shaft portion 63 is rotatably supported by said bearing 92. Likewise, brake cup 86 has needle bearing 93 mounted in its bore for rotatable support of shaft portion 65.

Extending forwardly from worm 64 is the shaft portion 94 rotatably supported by the anti-friction bearing 95, and likewise, extending from worm 66 is the shaft portion 96 rotatably supported by the anti-friction bearing 97 with its inner race held to position on the shaft portion 96 by lock nut 98 and the outer race of this bearing mounted in a bored recess of the forward housing cover 19 and held to position by the bearing retainer cap 99. The outer race of bearing 95 is mounted in another bored recess of the forward housing cover 19 and held to position by bearing retainer 100 which has a centrally bored recess for insertion therein of oil seals 101 for preventing leakage of lubricating oil from the housing. Mounted forward on the shaft portion 94 are the inner race of bearing 95, a spacing sleeve 102, a gear 103 drivingly keyed as at 104, and a lock nut 105 for drawing up and holding these parts together.

The gear 103 (Fig. 1) is drivingly meshed with gear 106 coupled with gear 107, which in turn, is meshed with and drives gears 108 and 109 drivingly mounted, respectively, on toolholding spindles 110 and 111 having Morse taper sockets, as indicated by the dotted lines 112, for holding the correspondingly formed shanks of cutting tools 113 and 114. This mechanism is supported by the spindle housing 115 bolted as at 116 to the forward housing cover 19. The mounting of spindles on anti-friction bearings to provide for thrust are well known in the art and their details form no part of the present invention.

Referring now to the worm gear 67 (Figs. 1 and 3), which is rotatably mounted with needle bearing 117 in its bore, and this bearing, in turn, mounted on the shank of bolt 118 supported in corresponding holes of brackets 119 and 120, between the brackets and the opposite faces of the hub portion of the worm gear are thrust washers 121 and 122 against which the inner race (being slightly longer than the outer race) of this needle bearing is drawn tight together with the brackets by the lock nut 123 threaded on the end of bolt 118. The bracket 119 is rigidly secured to a guide bar 124 by welding or other means, and, likewise, the bracket 120 is secured to a guide bar 125.

The housing 11 is supported and guided by the guide bars 124 and 125 extending lengthwise therethrough and beyond the forward housing cover 19 and the rearward housing cover 17. These guide bars are held rigidly stationary in the corresponding mounting half bores formed in the rearward and forward guide bar supports 126 and 127, respectively, projecting from a table or bed 128. On the guide bar 124 midway of the portion in its rearward support 126, a snap ring 129 is seated in corresponding grooves of this guide bar and in its mounting half bore of this support for resisting thrust transmitted thereto by the worm gear 67 (Fig. 1), and likewise, snap ring 130 is seated in corresponding grooves of the guide bar 125 and in its mounting half bore of support 126 (Fig. 6). Both guide bars are held down by bolts 131 located as indicated by dotted lines shown in Fig. 1.

Referring to the mechanism actuating the clutches 61 and 62 (Figs. 1, 2, and 4), the groove 79 of shipper sleeve 78 is engaged by a lug 132 of clutch shifter 133. A similar lug 134 of the clutch shifter 135 engages groove 81 of shipper sleeve 80. Both clutch shifters 133 and 135 are bored and keyways formed therewith for slidable mounting on a stationary shaft 136 and key 137 seated therein to keep the clutch shifters in their radial alignment. A groove 138 is formed in clutch shifter 133 for engagement by roller 139 having a shaft rotatably mounted in a correspondingly bored hole of lever 140, which is mounted on shaft 141 and keyed thereto as at 142. In engagement of groove 143 of clutch shifter 135 is roller 144 with its shaft rotatably mounted in the correspondingly bored hole of lever 145 mounted on shaft 146 and keyed thereto as at 147. Shafts 141 and 146 are rotatably supported and extend through correspondingly bored holes in bosses of a solenoid housing inner half 148 and outer half 149. A lever 150 is bored for mounting on shaft 146 and is keyed thereto as at 151 for actuation by a push-pull solenoid 152 through linkage 153 to lever 150. The solenoid 152 (Fig. 5) is bolted as at 154 to the solenoid housing inner half 148 which, together with this housing outer half 149, is bolted as at 154a to the housing portion 16.

Levers 155 and 156 (Figs. 4 and 6) are joined to a common hub which is bored for mounting on shaft 141 and keyed thereto as at 157, lever 155 has a roller 158 for engagement with the inclined surface 159 of trip dog 160 for oscillating shaft 141 in one direction on the return travel motion of housing 11. Lever 156 has a roller 158a for engagement with the inclined surface 161 of trip dog 162 for oscillating shaft 141 in the opposite direction upon forward travel motion of the housing 11, as indicated by the directional arrow extending from roller 158a in Fig. 6.

A lever 163 bored at its hub is mounted on shaft 146 and keyed thereto as at 164. This lever has a roller 165 for engagement by lug 166 of trip dog 167 to oscillate the shaft 146 and the lever 145 in a direction to shift the shipper sleeve 80 so as to partially disengage the clutch discs 74 from clutch discs 76 for permitting slip under heavy load, such as the housing 11 coming against the adjusting screw "stop" 168, as indicated by the directional arrow in Fig. 1. This adjusting screw is locked by nut 169 (Figs. 1 and 6). The trip dog 167 may be also utilized for preventing overtravel of housing 11, since continued travel thereof will shift the clutch 62 from driving engagement with the clutch cup 44 to the brake cup 86. The travel of lever 163 in the position assumed by the dotted lines (Fig. 6) for engagement by lug 166 of trip dog 167 is indicated by the directional arrow extending from the lever roller 165.

The limit switch 170 (Fig. 6) is bolted as at 171 to the solenoid housing outer half 149. This limit switch has a lever 172 with a roller 173 for actuation by trip dog 174, as indicated by the directional arrow extending from roller 173 in Fig. 6. Upon nearly reaching the end of the forward travel of housing 11, this lever is oppositely actuated by trip dog 175.

All of the trip dogs are mounted on the supporting bar 176 being angularly grooved at the top and bottom thereof as at 177 and 178, respectively. This supporting bar is rigidly held by bolts 179 to brackets 180 and 181, which are secured to the bed or table 128 by bolts 182. The trip dogs have an angular undercut shoulder resting on a side portion of the angular groove 177, and at their lower ends are formed angularly for a portion of their width as at 183 for clamping engagement by the corresponding side portion of groove 184 of clamps 185. The opposite side portion of this latter groove engages the corresponding side portion of groove 178 in the supporting bar 176 with the clamps drawn tight thereto by bolts 186 threaded into the trip dogs for securing the trip dogs to position on this supporting bar.

Referring to the electrical controls and circuit (Figs. 5 and 6), the limit switch previously designated 170 has a normally neutral positioning contact lever 187 permanently connected with the electric power line 188, while the other electric power line 189 is permanently connected to one end of each of coils 190 and 191 of the solenoid 152. Actuated through lever 172 by trip dog 174, the contact lever 187 makes circuit with line 192 running to the normally "open" push button switch 193, which upon actuation, in turn, makes circuit with line 194 running to and in connection with the other end of coil 191, thus energizing this coil for "pull" operation of the solenoid. The lever 172 actuated by trip dog 175, in turn, actuates the contact lever 187 to make circuit with the line 195 running to a normally "open" conventional time delay switch 196, which is, thus, actuated automatically at a predetermined time delay setting to make circuit with line 197 running to the other end of coil 190 to energize this coil for "push" operation of the solenoid 152. This time delay switch is utilized for a "dwell" at the end of the forward travel motion of the housing 11 in conjunction with the adjusting screw "stop" 168 for delay of the return travel motion of the housing.

The time delay switch 196 may be eliminated and the line 195 run directly to the coil 190, thus energizing this coil immediately upon contact lever 187 making contact with line 195.

The power lines to the electric driving motor 12 are not shown in the first form of apparatus (Figs. 1 to 6, inclusive) as the motor is started in the conventional way and being operated independently of the electrical control circuit just described.

An overload relay may be inserted in the circuit of the motor lines (not shown) to break the circuit with the power lines, permitting the motor to stop without damage thereto when a mishap occurs to cause the motor to be overloaded, such as when the housing is stopped by the breaking of a tool or other accidental obstructions before completing normal phases of travel motion.

*Operation of the first form of the apparatus*

In operation of the first form of the apparatus 10 in accordance with the arrangement in Figs. 1 to 6, inclusive, let it be assumed that the electric driving motor 12 is running with sheave 22, driving the V-belt 28, and sheave 29, together with clutch cup 37, in turn, driving through the gearing arrangement 43 and the clutch cup 44. The clutches 61 and 62, are shifted to engagement with brake cups 83 and 86, respectively, for restraining both worms 64 and 66 from rotating. The various levers and trip dogs are positioned as shown in Figs. 4, 5, and 6.

From the phase of operation just described, to start forward travel motion of the housing 11, push button switch 193 is depressed, thus making contact of line 192 with line 194, which is connected to coil 191. As the contact lever 187 of limit switch 170 is in closed position for contact of line 192 to the electric power line 188, the circuit is now closed, thus energizing coil 191 in "pull" operation of solenoid 152, throwing lever 150 forward and lever 145 rearward, shifting clutch 62 in engagement with clutch cup 44, in turn, now drivingly rotating worm 66 counterclockwise and thereby rotating the worm gear 67, while worm 64 is still restrained from rotating. Since both worms are in mesh with the worm gear rotatably mounted on the stationary support, a forward thrust is imparted to both worms and transmitted to bearings 95 and 97 locked to position in forward housing cover 19 bolted to housing portion 16, thereby causing forward travel motion of the housing 11 on guide bars 124 and 125 at a relatively rapid rate. Due to the differential manner of operation of the worms in conjunction with the worm gear, this rate of travel motion equals one-half of the lead × speed of worm 66, while worm 64 is held from rotating. In this phase of operation, the lever 163 is actuated forward to the position indicated by dotted lines in Fig. 6 simultaneously with the lever 150 upon the "pull" operation of solenoid 152.

As the housing 11 continues in rapid forward travel motion, roller 158a is subsequently engaged, and lever 156 is actuated by trip dog 162, throwing lever 140 rearward, thus, shifting clutch 61 in engagement with the clutch cup 37, which thereupon drivingly rotates worm 64 clockwise and therewith the toolholding spindles 110 and 111 through gears 103, 106, 107, 108, and 109. The worms 64 and 66 are now both rotating, but in opposite directions at different speeds (worm 64 at a lesser speed than worm 66 relative to the ratio of the pick-off gears 54 and 55 employed). Thus, the speed × lead of worm 64 subtracts from the speed × lead of worm 66 in exerting forward travel motion of housing 16 at a rate equal to one-half the difference of speed × lead between the worms, thereby, slowing the housing in forward travel motion to a rate of speed adaptable to the feed of cutting tools at a specific rate relative to the ratio of the pick-off gears 54 and 55 and the ratios between other pairing gears of the gearing arrangement 43. These ratios when compounded provide for altering the rate of travel motion in steps to an extremely fine degree over a wide speed range.

For reversing the direction of travel motion of housing 11 trip dog 175 is so positioned that toward the end of a predetermined length of travel motion, lever 172 of limit switch 170 is tripped, and throwing simultaneously therewith contact lever 187 to the position indicated by the dotted lines in Fig. 6, thus making contact of electric power line 188 with line 195 running to the time delay switch 196, which upon the end of a predetermined time delay setting, automatically contacts line 195 with line 197 closing the circuit, thus energizing coil 190 in "push" operation of solenoid 152 throwing lever 150 rearward and simultaneously therewith lever 145 forward shifting clutch 62 to engagement with brake cup 86 halting worm 66 while worm 64 continues to be drivingly rotated, thereby causing a rearward direction of thrust to these worms and transmitted therefrom to the bearings 95, 97 and therewith to the housing 11 for relative rapid return travel motion thereof.

The foregoing described operation of the time delay switch 196 permits a "dwell" of a predetermined length of time upon the housing 11, reaching the end of its forward travel motion before reversing direction of travel. In this event, the adjusting screw "stop" 168 may be employed and the forward housing cover 19 permitted to come to rest against this "stop" while just previously thereto, the clutch 62 may be partially disengaged to relieve pressure against the clutch plates 74 and 76 by positioning the trip dog 167 to actuate lever 163. For this purpose, just before the housing reaches the adjusting screw "stop," and as the housing comes to rest against this "stop," the worm 66 is caused to slow down to the speed of worm 64 by the load encountered causing slip of clutch plates 74 and 76. This action is not severe due to the differential action of the worms, the lead of one canceling out the lead of the other. This slip usually amounts to the equivalent of less than one-half revolution during a half-second "dwell" with the ordinary rate of feed of cutting tools.

The "dwell" phase of operation may be omitted. In such event, the time delay switch 196 may be eliminated and the electrical circuit arranged, accordingly, as previously described, to energize coil 190 of solenoid 152 immediately upon limit switch lever 172 being actuated rearward by trip dog 175 for the shifting action of the clutch 62 to halt worm 66 while worm 64 continues to be drivingly rotated so as to impart relatively rapid return travel motion to housing 11.

At the beginning of the relatively rapid return travel motion of housing 11, the limit switch lever 172 moves from engagement with trip dog 175, and the limit switch contact lever 187 then assumes its normally neutral position. Upon the housing nearing the end of its return travel motion, trip dog 160 actuates lever 155, shifting clutch 61 from driven engagement with clutch cup 37 to braking engagement with brake cup 83 to halt worm 64. The worm 66 previously having been halted, the housing is stopped. The limit switch is reset by lever 172 being actuated forward by trip dog 174 just before the housing reaches the end of its return travel, thus positioning the contact lever 187 and remaking contact of line 188 with line 92 for readiness to repeat the "start" of the relatively rapid forward phase of travel motion by again depressing the push button switch 193.

Second form of the apparatus

A modified apparatus 10a of a second form shown in Figures 7 to 9, inclusive, is generally similar in construction to that of the first form of apparatus 10 shown in Figs. 1 to 6, inclusive, and similar parts are similarly designated. In the modification (Fig. 7), the clutch 61 is eliminated together with the clutch cup 37, brake cup 83, the sheaves 22 and 29, V-belt 28, and motor 12, including the omission of the mounting thereof on top of housing portion 16 as in the first form (Figs. 1 to 6 inclusive); and instead, in the second form, a reversible motor 198 (Figs. 7 and 9) is used having a drive shaft 199 and mounted with its frontal cover 200 secured to the housing portion 16, including a modified bearing retainer 41a recessed for oil seals 42.

The worms of the second form of apparatus are generally similar as in the first form. However, in the second form (Fig. 7), they are shown threaded right hand rather than left hand, and these worms are now designated 64a and 66a together with the worm gear correspondingly modified and designated 67a. The worm 64a is further modified to include a rearward extending shaft portion 201 drivingly supported and keyed as at 202 in the bore of a sleeve-like hub 203 of a driving gear element 204 rotatably supported by the anti-friction bearing 38. The gear element 204 has gear 50 of the gearing arrangement 43 formed at the periphery thereof. The motor drive shaft 199 is mounted and drivingly keyed as at 205 in the bore of the sleeve-like hub 203.

Mounted on the forward shaft 94 of worm 64a is gear 103 drivingly meshed with an idling gear 206 which in turn drives gear 207 which is mounted and keyed as at 208 on the toolholding spindle 209, which is rotatably mounted in the conventional way on anti-friction bearings supported by the spindle housing 209 secured to the forward housing cover 19. This spindle 209 has an adjustable adaptor for holding a tap or other similarly actuated elements mounted in a correspondingly formed socket.

Referring to the gearing arrangement 43, the ratio of the pick-off gears 54 and 55 utilized is relative to the lead of both worms revolving to impart travel motion, the ratio of the gears 103 and 207 driving the toolholding spindle, and the lead of a tap or other similar elements required to be driven at a specific lead.

Further modifications are now described in respect to the shifting mechanism (Figs. 8 and 9) for driving and braking engagement of clutch 62 mounted on the shaft portion 65 of worm 66a, the solenoid 152 of the first form (Figs. 1 to 6 inclusive) being omitted in this second form (Figs. 7 to 9 inclusive). Instead, the shaft 146 supported through boss of side cover 212 (Figs. 8 and 9) is oscillated by levers 213 and 214 joined to a common hub 215 which is keyed as at 216 to shaft 146. Lever 213 has a roller 217 for engagement by the inclined surface 218 of trip dog 219 upon forward travel of the modified housing 11a, as indicated by the arrow extending from roller 217 (Fig. 9), for actuating lever 213 and therewith lever 145 shifting shipper sleeve 80 thereby to driving engagement of clutch 62. This shipper sleeve is oppositely shifted for braking engagement of said clutch by lever 145 which is actuated with shaft 146 by lever 214 with a roller 220 thereof engaging the inclined surface 221 of trip dog 222 positioned to act upon a predetermined length of return travel motion of housing 11a.

Secured to the side cover 212 is limit switch 223 of the single contact type having a contact lever 224 actuated, in turn, by lever 225 with roller 226 which is actuated forward by trip dog 227, and rearward by trip dog 228, as indicated by the arrow extending from the roller 226 in Fig. 9. All of the trip dogs in this second form of apparatus (Figs. 7 to 9 inclusive) are mounted and secured to position as previously described in the first form of apparatus (Figs. 1 to 6, inclusive).

Referring now to the electrical controls and circuit (Fig. 9), limit switch 223, the push button switch 229, the coil 230 of the first contactor relay 231, and the coil 232 of the second contactor relay 233 are operated on relatively low voltage current carried by lines 234 and 235. These lines are connected to the secondary winding 236 of the step-down transformer 237 of which the primary winding 238, from which lines 239 and 240 are respectively connected to the first two of the three main power lines 241, 242, and 243 carrying from the power source the relatively high voltage current the reversible motor 198, is operated on.

Branching from line 234 is the line 244 running to the right hand terminal of the normally open push button switch 229 and connected to the left hand terminal thereof is line 245 running to and connected with a terminal of the coil 230 and to the upper left hand terminal of the relay contactor 231 while the opposite upper right hand terminal thereof is connected to the line 234. Branching also from line 234 is the line 246 running to the terminal in permanent contact with the contact lever 224 of the limit switch, and connected to the other terminal thereof is line 247 running to a terminal of coil 232 of the second contactor relay 233, while the other terminal of this coil is connected to the line 235. Branching from this latter line is line 248 running to and connected with the upper right hand terminal of the relay contactor 233. Connected to the opposite upper left hand thereof is line 249 running to the other terminal of coil 230 of the contactor relay 231.

The contactor relays 231 and 233 (Fig. 9) each have four pairs of terminals with a contactor blade operating for closing or bridging the gap between a right and a left hand terminal of each pair of terminals. The upper or first contactor blade of both contactor relays are utilized for controlling the holding current of coil 230 of contactor relay 231 in conjunction with the push button switch 229 and the limit switch 223.

The first or upper contactor blade of contactor relay 233 normally closes and contacts line 249 with line 235 when coil 232 is de-energized while the contact lever 224 of limit switch 223 is in open position. The first or upper contactor blade of the contactor relay 231 serves as a holding circuit blade closing and contacting line 245 with line 234 upon coil 230 being energized by depressing the push button switch 229. Thus, the circuit is held in energization of coil 230 after the momentary operation of the push button switch. However, upon the contact lever 224 of the limit switch being actuated into closed position thereupon, energizing coil 232 of the contactor relay 233 consequently raises the contactor blades thereof. Thus, the holding circuit to coil 230 is broken, and this latter coil de-energized. Thereupon, all the contactor blades of contactor relay 231 drop out to open position.

The reversible motor 198 is wired in a circuit arrangement to start and directly drive worm 64a, which in turn, cooperatively imparts forward travel to the housing 11a. For this phase of operation, the relay contactor 231 is connected to the right hand terminal of the second pair thereof, branch line 250 running to the power line 243, the right hand terminal of the third pair branch line 251 running to power line 242, the right hand terminal of the fourth pair branch line 252 running to power line 241, the left hand terminal of the second pair branch line 253, the left hand terminal of the third pair branch line 254, the left hand terminal of the fourth pair branch line 255. The branch lines 253, 254, and 255, respectively, run to lines 256, 257, and 258, which are connected to specific operating phases of the motor winding for the correspondingly forward directional driving impulse required.

For reversing the direction of rotation of the reversible motor 198 at the end of a predetermined length of forward travel motion and thereupon reverse the direction of travel motion of housing 11a in this second form of apparatus, the wiring circuit includes the contactor relay 233 having the left hand terminal of the second pair connected to line 258 while the right hand terminal of this pair is connected to power line 241, the left hand terminal of the third pair is connected to line 256 while the right hand terminal thereof is connected to power line 242, the left hand terminal of the fourth pair is connected to line 257 while the right hand terminal thereof is connected to power line 243, thereby the phase impulse is altered to reverse the direction of rotation of the motor upon energization of coil 232 of this contactor relay 233 thereupon raising the contactor blades thereof to close the circuit of the lines connected to the three pairs of terminals just mentioned.

In operation of this second form of apparatus (Figs.

7 to 9 inclusive), to start up the motor 198, the push button switch 229 is depressed, thus energizing the coil 230 of the relay contactor 231, thereupon raising the four contactor blades thereof, the upper or first blade serving as a holding circuit contactor for closing the circuit of the lines connected to the first pair of terminals of this contactor relay 231 and the three succeeding contactor blades closing the circuit of the lines connected to the corresponding three pairs of terminals, thereby closing the circuit of these lines running from the power lines and to the motor lines so as to run the motor directionally for driving worm 64a to cooperatively impart, in conjunction with worm 66a being temporarily held stationary, relatively rapid forward travel motion of the housing 11a.

At a predetermined length of relatively rapid forward travel motion, the trip dog 219 being correspondingly positioned actuates lever 213 to drivingly engage clutch 62 to in turn rotate worm 66a at a lesser speed than worm 64a so as to then impart forward travel motion at a lesser specific speed rate as correspondingly required from the lead of a tap or other similarly driven elements which may be utilized. This phase of operation is commonly called "lead-in."

At the predetermined end of this "lead-in" phase of travel motion, the trip dog 228 being correspondingly positioned actuates lever 225 of limit switch 223 rearwardly. Thereby, contact lever 224 swings forward to the position indicated by dotted lines (Fig. 9), making contact with line 246 to line 247, closing the circuit in energization of coil 232 of relay contactor 233, raising the four contactor blades thereof. Thus, the first or upper contactor blade breaks the holding circuit de-energizing coil 230 of contactor relay 231 and the four contactor blades thereof drop out, breaking the circuit of lines 253, 254, and 255 to the motor lines while thereupon the second, third, and fourth contactor blades of contactor relay 233 close the circuit of the lines running to the correspondingly positioned pairs of terminals in the altered phase impulse arrangement of the motor winding, reversing the direction of motor drive, and therewith worm 64a and worm 66a, while clutch 62 is still drivingly engaged to impart return travel motion at a rate of travel corresponding to the lead of a tap or other similarly driven elements in a phase of operation termed "lead-out."

Continuing the "lead-out" phase of operation at a predetermined length of travel, trip dog 222 being correspondingly positioned actuates lever 214 to engage the clutch 62 with the brake cup 86, halting the worm 66a while the worm 64a continues to be drivingly rotated reversely thereby materially increasing the rate of travel motion over that of the "lead-out" phase during this subsequent phase termed "rapid return." Upon nearing completion of this latter phase of operation, trip dog 227 actuates lever 225 forward, thereby swinging contact lever 224 of limit switch 223 rearwardly from contact with line 247 thus breaking the circuit to and de-energizing coil 232 of the contactor relay 233, dropping the contactor blades thereof and disconnecting the lines running to the second, third and fourth pairs of terminals of this reversing circuit arrangement from the power lines to the motor 198 while the first contactor blade of this latter contactor relay contacts line 248 with line 249 for resetting the circuit to again start up the motor for driving operation in rapid forward travel motion of the housing 11a by depressing the push button switch 229.

Having thus described my invention, I claim:

1. In combination, a toolholding carrier arranged for travel motion, driving means, two threaded elements arranged for rotation of one at a relatively greater speed than that of the other to impart travel motion to the toolholding carrier, a clutch selectively engageable to drivingly connect or disconnect the driving means with the threaded element arranged to rotate at the greater speed, a clutch shifter together with mechanism actuated by the travel motion of said toolholding carrier to at least partially drivingly disengage said clutch for permitting the slowing down of the latter threaded element to the speed of the other threaded element in cooperative arrangement with a stop provided to engage the toolholding carrier for halting travel motion thereof.

2. In combination, a toolholding carrier mounted for travel motion, two worms in parallel spaced relation with a worm gear operative between and in mesh with both worms, driving means to rotate the worms oppositely at different speeds, a clutch and a stationary brake element associated with the worm arranged for rotation at the greater speed including a clutch shifter magnetically operative for selective engagement of said clutch to drivingly connect or disconnect the driving means with this worm, additional mechanism for shifting operation of the clutch to provide actuation thereof by the travel motion of the toolholding carrier for at least partial disengagement of said clutch to permit drivingly the slowing down of the latter worm to the speed of the other worm in cooperative arrangement with a stop provided for engagement with the toolholding carrier to temporarily halt same for a dwell phase of operation, a time delay switch operative at a predetermined time delay setting to energize magnetically said clutch shifter for engagement of the clutch with the stationary brake element for halting the worm associated therewith while the other worm is drivingly rotated so as to provide return travel motion of said toolholding carrier.

References Cited in the file of this patent

UNITED STATES PATENTS

| | | |
|---|---|---|
| 1,808,714 | Nye | June 2, 1931 |
| 1,918,587 | Bryant | July 18, 1933 |
| 2,188,462 | Meikle | Jan. 30, 1940 |
| 2,516,842 | Baker | Aug. 1, 1950 |